United States Patent
Xiang et al.

(10) Patent No.: US 11,487,456 B1
(45) Date of Patent: Nov. 1, 2022

(54) UPDATING STORED CONTENT IN AN ARCHITECTURE UTILIZING A MIDDLE MAP BETWEEN LOGICAL AND PHYSICAL BLOCK ADDRESSES

(71) Applicant: VMware, Inc., Palo Alto, CA (US)

(72) Inventors: Enning Xiang, San Jose, CA (US); Wenguang Wang, Santa Clara, CA (US)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/238,984

(22) Filed: Apr. 23, 2021

(51) Int. Cl.
*G06F 3/06* (2006.01)
*G06F 12/02* (2006.01)

(52) U.S. Cl.
CPC ............ *G06F 3/0644* (2013.01); *G06F 3/064* (2013.01); *G06F 3/0619* (2013.01); *G06F 3/0679* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 6,038,639 A * | 3/2000 | O'Brien | G06F 11/1435 711/208 |
| 8,452,819 B1 | 5/2013 | Sorenson, III et al. | |
| 2012/0239855 A1 | 9/2012 | Tootoonchian et al. | |
| 2012/0317377 A1 | 12/2012 | Palay et al. | |
| 2018/0039422 A1* | 2/2018 | Li | G06F 3/0608 |
| 2018/0275873 A1 | 9/2018 | Frid et al. | |
| 2019/0188124 A1 | 6/2019 | Ferrante et al. | |
| 2020/0349032 A1* | 11/2020 | Nanda | G06F 12/1009 |

* cited by examiner

*Primary Examiner* — Kevin Verbrugge
(74) *Attorney, Agent, or Firm* — Patterson & Sheridan, LLP

(57) ABSTRACT

A method for updating block addresses is provided. The method includes overwriting content of a first data block referenced by a first logical block address (LBA) with updated content. Prior to overwriting, the content of the first data block is stored in a first physical block corresponding to a first physical block address (PBA), a logical map maps the first LBA to a first middle block address (MBA), and a middle map maps the first MBA to the first PBA. After overwriting, the updated content of the first data block is stored in a second physical block corresponding to a second PBA and, in response to the overwriting, the middle map is updated to map the first MBA to the second PBA instead of the first PBA.

20 Claims, 8 Drawing Sheets

300

Stripe 1

| PBA1 LBA11 | PBA5 LBA12 | PBA9 LBA5 | P0 |
| --- | --- | --- | --- |
| PBA2 LBA9 | PBA6 LBA10 | PBA10 LBA13 | P1 |
| PBA3 LBA4 | PBA7 LBA21 | PBA11 LBA22 | P2 |
| PBA4 LBA24 | PBA8 LBA25 | PBA12 LBA6 | P3 |

Stripe 2

| PBA13 LBA1 | PBA17 LBA3 | PBA21 LBA30 | P0 |
| --- | --- | --- | --- |
| PBA14 LBA31 | PBA18 LBA32 | PBA22 LBA33 | P1 |
| PBA15 LBA18 | PBA19 LBA17 | PBA23 LBA15 | P2 |
| PBA16 LBA2 | PBA20 LBA29 | PBA24 LBA8 | P3 |

Stripe 3

| PBA25 LBA9 | PBA29 LBA25 | PBA33 LBA29 | P0 |
| --- | --- | --- | --- |
| PBA26 LBA4 | PBA30 LBA5 | PB34 LBA30 | P1 |
| PBA27 LBA24 | PBA31 LBA18 | PBA35 LBA33 | P2 |
| PBA28 LBA10 | PBA32 LBA32 | PBA36 LBA15 | P3 |

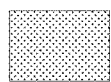 Stale Data

Logical Map

| LBA | PBA |
| --- | --- |
| LBA1 | |
| LBA2 | |
| LBA3 | |
| LBA4 | PBA3 → PBA26 |
| LBA5 | PBA9 → PBA30 |
| LBA6 | |
| LBA7 | |
| LBA8 | |
| LBA9 | PBA2 → PBA25 |
| LBA10 | PBA6 → PBA28 |
| LBA11 | |
| LBA12 | |
| LBA13 | |
| LBA14 | |
| LBA15 | PBA23 → PBA36 |
| LBA16 | |
| LBA17 | |
| LBA18 | PBA15 → PBA31 |
| LBA19 | |
| LBA20 | |
| LBA21 | |
| LBA22 | |
| LBA23 | |
| LBA24 | PBA4 → PBA27 |
| LBA25 | PBA8 → PBA29 |
| LBA26 | |
| LBA27 | |
| LBA28 | |
| LBA29 | PBA20 → PBA33 |
| LBA30 | PBA21 → PBA34 |
| LBA31 | |
| LBA32 | PBA18 → PBA32 |
| LBA33 | PBA22 → PBA35 |
| LBA34 | |
| LBA35 | |

FIGURE 3

UPDATING STORED CONTENT IN AN ARCHITECTURE UTILIZING A MIDDLE MAP BETWEEN LOGICAL AND PHYSICAL BLOCK ADDRESSES

BACKGROUND

In the field of data storage, a storage area network (SAN) is a dedicated, independent high-speed network that interconnects and delivers shared pools of storage devices to multiple servers. A virtual SAN (vSAN) may aggregate local or direct-attached data storage devices, to create a single storage pool shared across all hosts in a host cluster. This pool of storage (sometimes referred to herein as a "datastore" or "data storage") may allow virtual machines (VMs) running on hosts in the host cluster to store virtual disks that are accessed by the VMs during their operations. The vSAN architecture may be a two-tier datastore including a performance tier for the purpose of read caching and write buffering and a capacity tier for persistent storage.

The vSAN datastore may manage storage of virtual disks at a block granularity. For example, vSAN may be divided into a number of physical blocks (e.g., 4096 bytes or "4K" size blocks), each physical block having a corresponding physical block address (PBA) that indexes the physical block in storage. Physical blocks of the vSAN may be used to store blocks of data (also referred to as data blocks) used by VMs, which may be referenced by logical block addresses (LBAs). Each block of data may have an uncompressed size corresponding to a physical block. Blocks of data may be stored as compressed data or uncompressed data in the vSAN, such that there may or may not be a one to one correspondence between a physical block in vSAN and a data block referenced by a logical block address.

Each host may include a storage management module (referred to herein as a "vSAN module") to handle input/output (I/O) write or read requests of data blocks in the vSAN. For example, an I/O request to write a block of data may be received by the vSAN module, and through a distributed object manager (DOM) sub-module (e.g., zDOM sub-module) of the vSAN module, the data may be stored in a physical memory (e.g., a bank) and a data log of the vSAN's performance tier first, the data log being stored over a number of physical blocks. Once the size of the stored data in the bank reaches a threshold size, the data stored in the bank may be flushed to the capacity tier of the vSAN.

To reduce I/O overhead during write operations to the capacity tier, zDOM may require a full stripe (also referred to herein as a full segment) before writing the data to the capacity tier. Data striping is the technique of segmenting logically sequential data, such as the virtual disk. Each stripe may contain a plurality of data blocks; thus, a full stripe write may refer to a write of data blocks that fill a whole stripe. A full stripe write operation may be more efficient compared to the partial stripe write, thereby increasing overall I/O performance.

Segment cleaning may be introduced to provide clean and filled segments for the full stripe write. Because some solid-state storage devices (SSDs) of the vSAN may only allow write after erase operations (e.g., program/erase (P/E) cycles) and may not permit re-write operations, a number of active blocks of a stripe (e.g., segment) may be decreased. For example, for an overwrite (e.g., a write for a data block referenced by an LBA that previously had written data associated with the LBA), new physical blocks may be allocated to place new payload data associated with this LBA, and the physical blocks of the old payload data associated with this LBA may be marked as "stale" or "invalid" and recycled by garbage collection (e.g., removal of redundant data that has been overwritten but that still occupies physical space within the memory).

Segment cleaning may include both the identification of valid block(s) and the consolidation of valid block(s). Specifically, to perform segment cleaning, the zDOM sub-module may read all active blocks (e.g., valid blocks/blocks not overwritten) from one or more old segments and consolidate those active blocks to one or more new segments, to thereby free-up (i.e., "clean") the old segment and fill a new segment for full stripe writes to the capacity tier of vSAN. New data blocks may be written sequentially to the old (now clean) segment.

While segment cleaning may avoid write amplification (e.g., an undesirable phenomenon where the actual amount of information physically-written to the capacity tier is a multiple of the logical amount intended to be written) when flushing data from the in-memory bank to the capacity tier of vSAN, this may introduce severe I/O overhead when active blocks are referenced by multiple LBAs, which may be prevalent in snapshot mapping architectures.

Modern storage platforms, including vSAN datastore, may enable snapshot features for backup, archival, or data protections purposes. Snapshots provide the ability to capture a point-in-time state and data of a VM to not only allow data to be recovered in the event of failure but restored to known working points. Snapshots are not stored as physical copies of data blocks, but rather as pointers to the data blocks that existed when the snapshot was created.

Each snapshot may include its own mapping of LBAs mapped to PBAs directly. Thus, when an active block moves (e.g., is written) to a physical address as a result of segment cleaning for full stripe write, multiple LBAs pointing to this same PBA may need to be updated at different snapshot logical maps. Numerous metadata write I/Os at the snapshot logical maps may result in poor snapshot performance at the vSAN.

It should be noted that the information included in the Background section herein is simply meant to provide a reference for the discussion of certain embodiments in the Detailed Description. None of the information included in this Background should be considered as an admission of prior art.

BRIEF DESCRIPTION OF THE DRAWINGS

FIG. 3 is a diagram illustrating example segment cleaning used to consolidate active data blocks for full stripe writes, according to an example embodiment of the present disclosure.

DETAILED DESCRIPTION

Aspects of the present disclosure introduce a two-layer data block (e.g., snapshot extent) mapping architecture, where an extent is a specific number of contiguous data blocks allocated for storing information. Though certain aspects are described with respect to snapshot extents, they may be applicable to any data, data blocks, etc. In the mapping architecture, a middle map is included, such as to address the problem of input/output (I/O) overhead when dynamically relocating physical data blocks for full stripe writes. Instead of a logical block address (LBA) of a data block (e.g., of a snapshot extent) being mapped directly to a physical block address (PBA), the architecture described herein maps LBA(s) of data block(s) to a middle block address (MBA) of the middle map and the MBA maps to the PBA. With the help of the middle map, the system may not need to update multiple extents with LBAs that reference the same PBA, such as extents at different snapshot logical maps. Instead, only the PBA for the MBA in a single extent at the middle map may be updated to update the PBA for the multiple LBAs referencing the MBA.

Updating extents of the snapshot mapping architecture when writing payload data associated with one or more LBAs to new physical blocks in the datastore may result in an increase in I/O overhead needed to delete, create, and update extents not only at the snapshot logical map, but also at the middle map. Accordingly, a hybrid approach for updating extents of the snapshot mapping architecture may be considered. The hybrid updating approach presented herein seeks to optimize performance of the datastore by providing updating approaches such that metadata I/Os on extent mapping tables may be reduced for single, logical map extent overwrites by using a particular updating approach based on the type of update.

Figure 1:
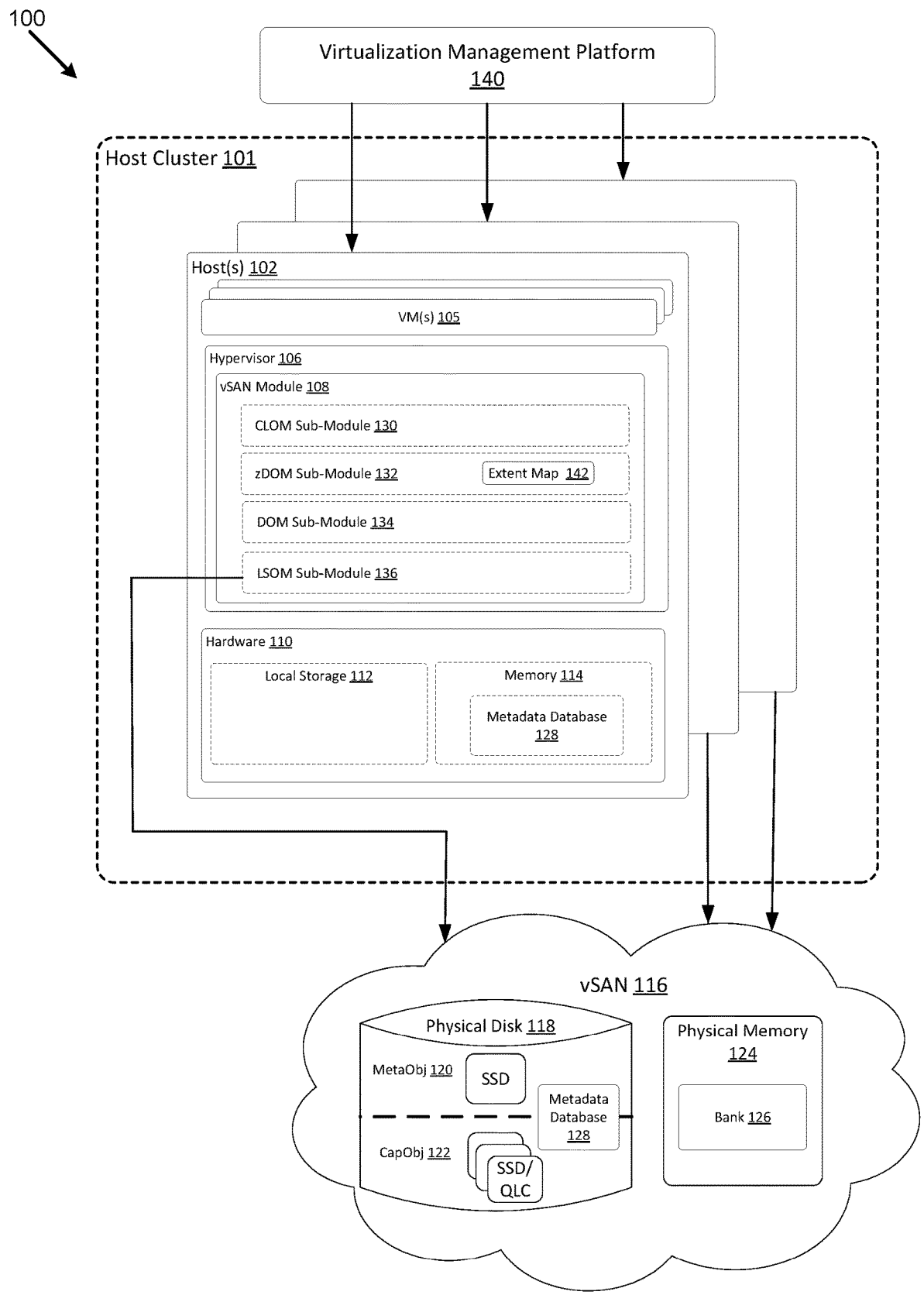
FIG. 1 is a diagram illustrating an example computing environment in which embodiments of the present application may be practiced.

FIG. 1 is a diagram illustrating an example computing environment 100 in which embodiments may be practiced. As shown, computing environment 100 may include a distributed object-based datastore, such as a software-based "virtual storage area network" (vSAN) environment 116 that leverages the commodity local storage housed in or directly attached (hereinafter, use of the term "housed" or "housed in" may be used to encompass both housed in or otherwise directly attached) to host(s) 102 of a host cluster 101 to provide an aggregate object storage to virtual machines (VMs) 105 running on the host(s) 102. The local commodity storage housed in the hosts 102 may include combinations of solid state drives (SSDs) or non-volatile memory express (NVMe) drives, magnetic or spinning disks or slower/cheaper SSDs, or other types of storages.

Additional details of vSAN are described in U.S. Pat. No. 10,509,708, the entire contents of which are incorporated by reference herein for all purposes, and U.S. patent application Ser. No. 17/181,476, the entire contents of which are incorporated by reference herein for all purposes.

As described herein, vSAN 116 is configured to store virtual disks of VMs 105 as data blocks in a number of physical blocks each having a PBA that indexes the physical block in storage. vSAN module 116 may create an "object" for a specified data block by backing it with physical storage resources of a physical disk 118 (e.g., based on a defined policy).

vSAN 116 may be a two-tier datastore, thereby storing the data blocks in both a smaller, but faster, performance tier and a larger, but slower, capacity tier. The data in the performance tier may be stored in a first object (e.g., a data log that may also be referred to as a MetaObj 120) and when the size of data reaches a threshold, the data may be written to the capacity tier (e.g., in full stripes, as described herein) in a second object (e.g., CapObj 122) in the capacity tier. Accordingly, SSDs may serve as a read cache and/or write buffer in the performance tier in front of slower/cheaper SSDs (or magnetic disks) in the capacity tier to enhance I/O performance. In some embodiments, both performance and capacity tiers may leverage the same type of storage (e.g., SSDs) for storing the data and performing the read/write operations. Additionally, SSDs may include different types of SSDs that may be used in different tiers in some embodiments. For example, the data in the performance tier may be written on a single-level cell (SLC) type of SSD, while the capacity tier may use a quad-level cell (QLC) type of SSD for storing the data. Write bandwidth in a QLC type of storage may be substantially lower than the read bandwidth (e.g., 400 MB/s to 2200 MB/s), and a QLC storage may be randomly written with 64 KB, or even 128 KB write without causing write amplifications, as described in more detail below. These attributes make QLC storages a very desirable candidate for writes which require a big volume of data being written to the storage at once.

As further discussed below, each host 102 may include a storage management module (referred to herein as a VSAN module 108) in order to automate storage management workflows (e.g., create objects in the MetaObj 120 and CapObj 122 of vSAN 116, etc.) and provide access to objects (e.g., handle I/O operations to objects in MetaObj 120 and CapObj 122 of vSAN 116, etc.) based on predefined storage policies specified for objects in the physical disk 118. For example, because a VM 105 may be initially configured by an administrator to have specific storage requirements for its "virtual disk" depending on its intended use (e.g., capacity, availability, I/O operations per second (IOPS), etc.), the administrator may define a storage profile or policy for each VM specifying such availability, capacity, IOPS and the like.

A virtualization management platform 140 is associated with host cluster 101. Virtualization management platform 140 enables an administrator to manage the configuration and spawning of VMs 105 on the various hosts 102. As illustrated in FIG. 1, each host 102 includes a virtualization layer or hypervisor 106, a vSAN module 108, and hardware 110 (which includes the storage (e.g., SSDs) of a host 102). Through hypervisor 106, a host 102 is able to launch and run multiple VMs 105. Hypervisor 106, in part, manages hardware 110 to properly allocate computing resources (e.g., processing power, random access memory (RAM), etc.) for each VM 105. Furthermore, as described below, each hypervisor 106, through its corresponding vSAN module 108, provides access to storage resources located in hardware 110 (e.g., storage) for use as storage for virtual disks (or portions thereof) and other related files that may be accessed by any VM 105 residing in any of hosts 102 in host cluster 101.

In one embodiment, vSAN module 108 may be implemented as a "vSAN" device driver within hypervisor 106. In such an embodiment, vSAN module 108 may provide access to a conceptual "vSAN" through which an administrator can create a number of top-level "device" or namespace objects that are backed by the physical disk 118 of vSAN 116. By accessing application programming interfaces (APIs) exposed by vSAN module 108, hypervisor 106 may determine all the top-level file system objects (or other types of top-level device objects) currently residing in vSAN 116.

A file system object may, itself, provide access to a number of virtual disk descriptor files accessible by VMs 105 running in host cluster 101. These virtual disk descriptor files may contain references to virtual disk "objects" that contain the actual data for the virtual disk and are separately backed by physical disk 118. A virtual disk object may itself be a hierarchical, "composite" object that is further composed of "component" objects that reflect the storage requirements (e.g., capacity, availability, IOPs, etc.) of a corresponding storage profile or policy generated by the administrator when initially creating the virtual disk. Each vSAN module 108 (through a cluster level object management or "CLOM" sub-module 130) may communicate with other vSAN modules 108 of other hosts 102 to create and maintain an in-memory metadata database 128 (e.g., maintained separately but in synchronized fashion in the memory 114 of each host 102) that may contain metadata describing the locations, configurations, policies and relationships among the various objects stored in vSAN 116. Specifically, in-memory metadata database 128 may serve as a directory service that maintains a physical inventory of the vSAN 116 environment, such as the various hosts 102, the storage resources in hosts 102 (SSD, NVMe drives, magnetic disks, etc.) housed therein and the characteristics/capabilities thereof, the current state of hosts 102 and their corresponding storage resources, network paths among hosts 102, and the like. The in-memory metadata database 128 may further provide a catalog of metadata for objects stored in MetaObj 120 and CapObj 122 of vSAN 116 (e.g., what virtual disk objects exist, what component objects belong to what virtual disk objects, which hosts 102 serve as "coordinators" or "owners" that control access to which objects, quality of service requirements for each object, object configurations, the mapping of objects to physical storage locations, etc.).

In-memory metadata database 128 is used by vSAN module 108 on host 102, for example, when a user (e.g., an administrator) first creates a virtual disk for VM 105 as well as when the VM 105 is running and performing I/O operations (e.g., read or write) on the virtual disk.

vSAN module 108, by querying its local copy of in-memory metadata database 128, may be able to identify a particular file system object (e.g., a VMFS file system object) stored in physical disk 118 that may store a descriptor file for the virtual disk. The descriptor file may include a reference to virtual disk object that is separately stored in physical disk 118 of vSAN 116 and conceptually represents the virtual disk (also referred to herein as composite object). The virtual disk object may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

The metadata accessible by vSAN module 108 in in-memory metadata database 128 for each virtual disk object provides a mapping to or otherwise identifies a particular host 102 in host cluster 101 that houses the physical storage resources (e.g., slower/cheaper SSDs, magnetics disks, etc.) that actually stores the physical disk of host machine 102.

Various sub-modules of vSAN module 108, including, in some embodiments, CLOM sub-module 130, distributed object manager (DOM) 134, zDOM 132, and/or local storage object manager (LSOM) 136, handle different responsibilities. CLOM sub-module 130 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 130 may also be accessed (e.g., to dynamically revise or otherwise update a virtual disk blueprint or the mappings of the virtual disk blueprint to actual physical storage in physical disk 118) on a change made by a user to the storage profile or policy relating to an object or when changes to the cluster or workload result in an object being out of compliance with a current storage profile or policy.

In one embodiment, if a user creates a storage profile or policy for a virtual disk object, CLOM sub-module 130 applies a variety of heuristics and/or distributed algorithms to generate a virtual disk blueprint that describes a configuration in host cluster 101 that meets or otherwise suits a storage policy. In some cases, the storage policy may define attributes such as a failure tolerance, which defines the number of host and device failures that a VM can tolerate. In some embodiments, a redundant array of inexpensive disks (RAID) configuration may be defined to achieve desired redundancy through mirroring and access performance through erasure coding (EC). EC is a method of data protection in which each copy of a virtual disk object is partitioned into stripes, expanded and encoded with redundant data pieces, and stored across different hosts 102 of vSAN datastore 116. For example, a virtual disk blueprint may describe a RAID 1 configuration with two mirrored copies of the virtual disk (e.g., mirrors) where each are further striped in a RAID 0 configuration. Each stripe may contain a plurality of data blocks (e.g., four data blocks in a first stripe). In some cases, including RAID 5 and RAID 6 configurations, each stripe may also include one or more parity blocks. Accordingly, CLOM sub-module 130, in one embodiment, may be responsible for generating a virtual disk blueprint describing a RAID configuration.

CLOM sub-module 130 may communicate the blueprint to its corresponding DOM sub-module 134, for example, through zDOM sub-module 132. The DOM sub-module 134 may interact with objects in vSAN 116 to implement the blueprint by, for example, allocating or otherwise mapping component objects of the virtual disk object to physical storage locations within various hosts 102 of host cluster 101. DOM sub-module 134 may also access the in-memory metadata database 128 to determine the hosts 102 that store the component objects of a corresponding virtual disk object and the paths by which those hosts 102 are reachable in order to satisfy the I/O operation. In some embodiments, some or all of the metadata database 128 (e.g., the mapping of the object to physical storage locations, etc.) may be stored with the virtual disk object in physical disk 118.

When handling an I/O operation from VM 105, due to the hierarchical nature of virtual disk objects in certain embodiments, DOM sub-module 134 may need to further communicate across the network (e.g., local area network (LAN), or WAN) with a different DOM sub-module 134 in a second host 102 (or hosts 102) that serves as the coordinator for the particular virtual disk object that is stored in the local storage 112 of the second host 102 (or hosts 102) and which is the portion of the virtual disk that is subject to the I/O operation. If the VM 105 issuing the I/O operation resides on a host 102 that is also different from the coordinator of the virtual disk object, the DOM sub-module 134 of the host 102 running the VM 105 may also have to communicate across the network (e.g., LAN or WAN) with the DOM sub-module 134 of the coordinator. DOM sub-modules 134 may also similarly communicate amongst one another during object creation (and/or modification).

Each DOM sub-module 134 may need to create their respective objects, allocate local storage 112 to such objects (if needed), and advertise their objects in order to update in-memory metadata database 128 with metadata regarding the object. In order to perform such operations, DOM sub-module 134 may interact with a local storage object manager (LSOM) sub-module 136 that serves as the component in vSAN module 116 that may actually drive communication with the local SSDs (and, in some cases, magnetic disks) of its host 102. In addition to allocating local storage 112 for virtual disk objects (as well as storing other metadata, such as policies and configurations for composite objects for which its node serves as coordinator, etc.), LSOM sub-module 136 may additionally monitor the flow of I/O operations to local storage 112 of its host 102, for example, to report whether a storage resource is congested.

zDOM module 132 may be responsible for caching received data in the performance tier of vSAN 116 (e.g., as a virtual disk object in MetaObj 120) and writing the cached data as full stripes on one or more disks (e.g., as virtual disk objects in CapObj 122). zDOM sub-module 132 may do this full stripe writing to minimize a write amplification effect. Write amplification, refers to the phenomenon that occurs in, for example, SSDs, in which the amount of data written to the memory device is greater than the amount of information you requested to be stored by host 102. Write amplification may differ in different types of writes. For example, in a small partial stripe write, the old content of the to-be-written blocks and parity blocks may be read in order to calculate the new parity blocks, and then the new blocks and the parity blocks may be written. In another example, for a large partial stripe write, the untouched blocks (e.g., blocks that are not needed to be written) in the stripe may be read in order to calculate the new parity blocks, and then the new blocks and the new parity blocks may be written. For a full stripe write, however, the datastore may need to only calculate the new parity blocks (e.g., based on the new blocks that need to be written), and then write the new blocks and the new parity blocks. The datastore does not need to read any of the blocks and may only calculate the parity blocks for the to-be-written blocks, and then write all of the data blocks and the calculated parity blocks. Thus, a full stripe write may result in a lower write amplification compared to a small partial stripe write and a large partial stripe write. Lower write amplification may increase performance and lifespan of an SSD.

In some embodiments, zDOM sub-module 132 also performs other datastore procedures, such as data compression and hash calculation, which may result in substantial improvements, for example, in garbage collection, deduplication, snapshotting, etc. (some of which may be performed locally by LSOM sub-module 136 of FIG. 1).

Figure 2:
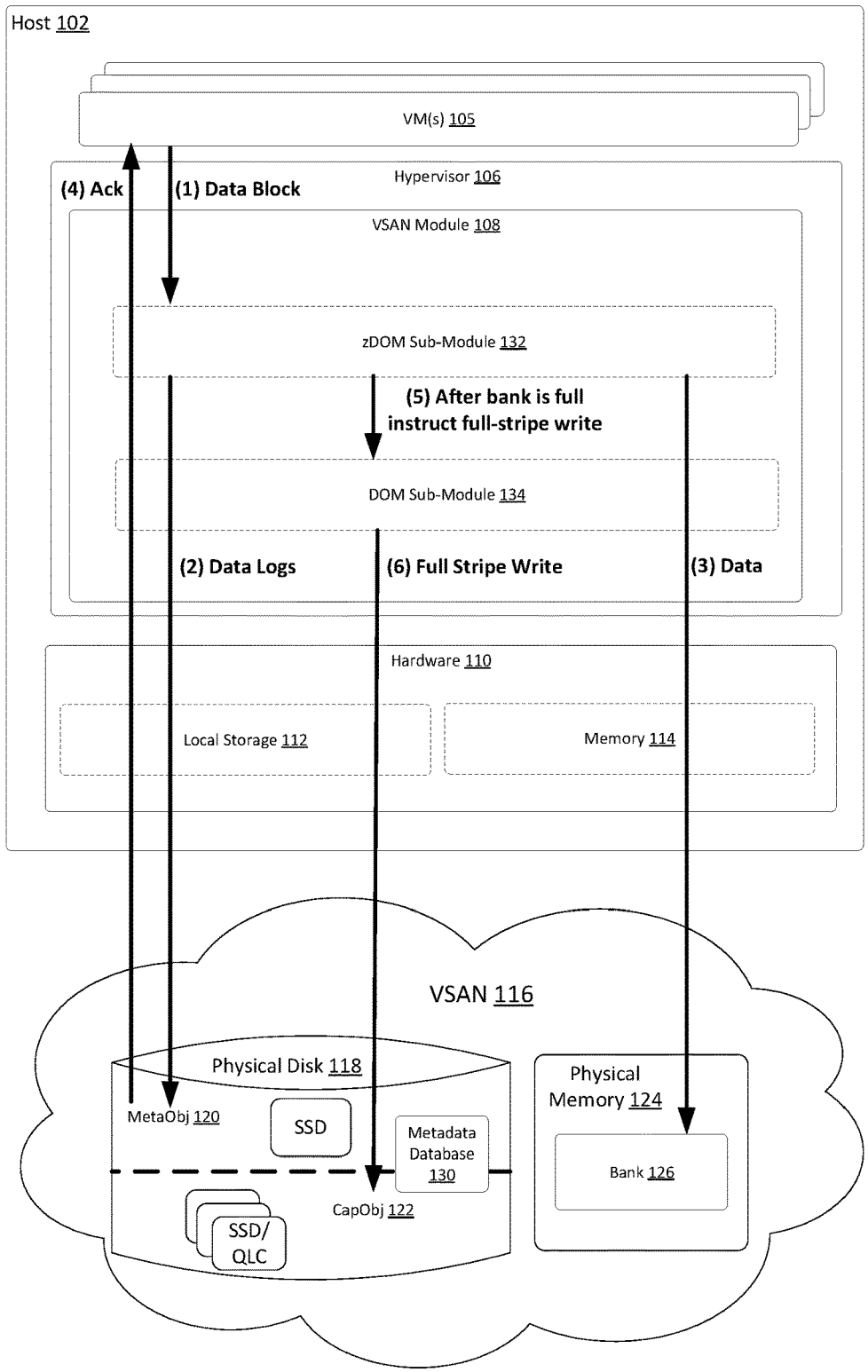
FIG. 2 is a diagram illustrating an embodiment in which a datastore module receives a data block and stores the data in the data block in different memory layers of a hosting system, according to an example embodiment of the present application.

FIG. 2 is a diagram illustrating an embodiment in which vSAN module 108 receives a data block and stores the data in the data block in different memory layers of vSAN 116, according to an example embodiment of the present application.

As shown in FIG. 2, at (1), zDOM sub-module 132 receives a data block from VM 105. At (2), zDOM sub-module 132 instructs DOM sub-module 134 to preliminarily store the data received from the higher layers (e.g., from VM 105) in a data log (e.g., MetaObj 120) of the performance tier of vSAN 116 and, at (3), in physical memory 124 (e.g., bank 126).

zDOM sub-module 132 may compress the data in the data block into a set of one or more sectors (e.g., each sector being 512-byte) of one or more physical disks (e.g., in the performance tier) that together store the data log. zDOM sub-module 132 may write the data blocks in a number of physical blocks (or sectors) and write metadata (e.g., the sectors' sizes, snapshot id, block numbers, checksum of blocks, transaction id, etc.) about the data blocks to the data log maintained in MetaObj 120. In some embodiments, the data log in MetaObj 120 includes a set of one or more records, each having a header and a payload for saving, respectively, the metadata and its associated set of data blocks. As shown in FIG. 2, after the data (e.g., the data blocks and their related metadata) is written to MetaObj 120 successfully, then at (4), an acknowledgement is sent to VM 105 letting VM 105 know that the received data block is successfully stored.

In some embodiments, when bank 126 is full (e.g., reaches a threshold capacity that satisfies a full stripe write), then at (5), zDOM sub-module 132 instructs DOM sub-module 134 to flush the data in bank 126 to perform a full stripe write to CapObj 122. At (6), DOM sub-module 134 writes the stored data in bank 126 sequentially on a full stripe (e.g., the whole segment or stripe) to CapObj 122 in physical disk 118.

zDOM sub-module 132 may further instruct DOM sub-module 134 to flush the data stored in bank 126 onto one or more disks (e.g., of one or more hosts 102) when the bank reaches a threshold size (e.g., a stripe size for a full stripe write). The data flushing may occur, while a new bank (not shown in FIG. 2) is allocated to accept new writes from zDOM sub-module 132. The number of banks may be indicative of how many concurrent writes may happen on a single MetaObj 120.

After flushing in-memory bank 126, zDOM sub-module 132 may release (or delete) the associated records of the flushed memory in the data log. This is because when the data stored in the bank is written to CapObj 122, the data is in fact stored on one or more physical disks (in the capacity tier) and there is no more need for storing (or keeping) the same data in the data log of MetaObj 120 (in the performance tier). Consequently, more free space may be created in the data log for receiving new data (e.g., from zDOM module 132).

In order to write full stripe (or full segment), vSAN module 108 may always write the data stored in bank 126 on sequential blocks of a stripe. As such, notwithstanding what the LBAs of a write are, the PBAs (e.g., on the physical disks) may always be continuous for the full stripe write.

Due to design issues and the limited number of writes allowed by memory cells of SSDs, an overwrite operation (e.g., a write for a data block referenced by an LBA that previously had written data associated with the LBA) may require that data previously associated with an LBA, for which new data is requested to be written, be erased before new content can be written (e.g., due to program/erase (P/E) cycles of the SSD). Erase operations may be block-wise. Therefore, data may be modified (i.e., written) only after the whole block to which it prior belonged is erased, which makes write operations significantly more costly than reads in terms of performance and energy consumption of the SSD. As is known in the art, a better alternative, as opposed to erasing a block each time new content is to be written for an LBA, may include marking an old block (containing the unchanged data) as "invalid" (e.g., not active) and then writing the new, changed data to an empty block. Invalid blocks may be garbage collected at a later time. While this may delay issuing erase operations thereby prolonging the lifespan of an SSD, stripes may become fragmented as the number of invalid blocks increases with each overwrite.

In order to provide clean stripes (e.g., segments) for zDOM sub-module 132 full stripe writes, segment cleaning may be introduced to recycle segments partially filled with "valid" blocks (e.g., active blocks) and move such valid block(s) to new location(s) (e.g., new stripe(s)). Segment cleaning consolidates fragmented free space to improve write efficiency. To free-up or clean selected segments, extents of the segments that contain valid data may be moved to different clean segments, and the selected segments (now clean) may be freed for subsequent reuse. Once a segment is cleaned and designated freed, data may be written sequentially to that segment. Selection of a clean segment to receive data (i.e., writes) from a segment being cleaned may be based, in some cases, upon an amount of free space (e.g., free blocks) remaining in the clean segment. Portions of data from the segment being cleaned may be moved to different "target" segments. That is, a plurality of relatively clean segments may receive differing portions of data from the segment(s) being cleaned.

FIG. 3 is a diagram illustrating example segment cleaning used to consolidate active data blocks for full stripe writes, according to an example embodiment of the present disclosure. As shown in the example of FIG. 3, valid (e.g., active) data blocks from two stripes, Stripe 1 and Stripe 2, may be consolidated into another stripe, Stripe 3. As described above, the stripes may include invalid blocks, due to, for example, one or more overwrites of data for one or more LBAs. Stripe 1 may include data blocks associated with PBAs 1 through 12 and parity blocks P0 to P3 (based, at least in part, on the RAID configuration), stripe 2 may include data blocks associated with PBAs 13 through 24 and parity blocks P0 to P3, and stripe 3 may include data blocks associated with PBAs 25 through 36 and parity blocks P0 to P3. In the illustrated example, six blocks, associated with PBA2, PBA3, PBA4, PBA6, PBA8, and PBA9, are valid blocks in Stripe 1 while six blocks, associated with PBA1, PBA5, PBA7, PBA10, PBA11, and PBA12, are invalid blocks (shown as patterned blocks) containing stale data in Stripe 1. Similarly, six blocks, associated with PBA15, PBA18, PBA20, PBA21, PBA22, and PBA23, are valid blocks in Stripe 2 while six blocks, associated with PBA13, PBA14, PBA16, PBA17, PBA19, and PBA24, are invalid blocks (shown as patterned blocks) containing stale data in Stripe 2.

As shown, an extent map 142 can be stored and is accessible by vSAN module 108, for example, by the zDOM sub-module 132. The extent map 142 provides a mapping of LBAs to PBAs. Each physical block having a corresponding PBA in each of Stripes 1, 2 and 3 may be referenced by LBAs. For each LBA, the vSAN module 108, may store in a logical map, at least a corresponding PBA. The logical map may include an LBA to PBA mapping table. For example, the logical map may store tuples of <LBA, PBA>, where the LBA is the key. In some embodiments, the logical map further includes a number of corresponding data blocks stored at a physical address that starts from the PBA (e.g., tuples of <LBA, PBA, number of blocks>, where LBA is the key). In some embodiments where the data blocks are compressed, the logical map further includes the size of each data block compressed in sectors and a compression size (e.g., tuples of <LBA, PBA, number of blocks, number of sectors, compression size>, where LBA is the key). In the example shown in FIG. 3, data previously written to a block in Stripe 1 corresponding to PBA2 is referenced by LBA9. Thus, the logical map may store a tuple of <LBA9, PBA2>. Similar tuples may be stored in the logical map for other LBAs in Stripes 1, 2, and 3. According to the information stored in the logical map, vSAN module 108 can use the logical map to determine which PBA is referenced by an LBA.

As discussed above, valid data blocks within each of Stripe 1 and Stripe 2 may be taken out of their respective stripes and consolidated into one stripe, Stripe 3. Therefore, one full stripe may be produced as a result. Stripe consolidation may include reading the data blocks of Stripe 1 and Stripe 2, identifying only valid blocks within each of Stripe 1 and Stripe 2, and moving the identified valid data blocks into a write buffer. The contents of the logical map may be updated to indicate proper disk locations. For example, as shown in FIG. 3, data block contents of LBA9, LBA4, LBA24, LBA10, LBA25, and LBA5 may be collectively written to blocks of Stripe 3, wherein the blocks of Stripe 3 correspond to PBA25-PBA36. Similarly, data block contents of LBA18, LBA32, LBA29, LBA30, LBA33, and LBA15 may be collectively written to blocks PBA25-PBA36 of Stripe 3. The original PBAs corresponding to the LBAs written to Stripe 3 may be marked "stale" or "invalid" following completion of the write of data to Stripe 3. Additionally, the logical map may be updated to reflect the changes of the PBAs mapped to the LBAs. For example, for the LBA9, the tuple may be updated from <LBA9, PBA2> to <LBA9, PBA25>, and the physical addresses corresponding to LBA4, LBA24, LBA10, LBA25, LBA5, LBA18, LBA32, LBA29, LBA30, LBA33, and LBA15 may be updated similarly.

The dynamic relocation of valid (e.g., active) blocks to new locations may not only trigger updates to the logical map but also to a snapshot mapping architecture. Modern storage platforms, including vSAN 116, may enable snapshot features for backup, archival, or data protections purposes. Snapshots provide the ability to capture a point-in-time state and data of a VM 105 to not only allow data to be recovered in the event of failure but restored to known working points. Snapshots may capture VMs' 105 storage, memory, and other devices, such as virtual network interface cards (NICs), at a given point in time. Snapshots do not require an initial copy, as they are not stored as physical copies of data blocks, but rather as pointers to the data blocks that existed when the snapshot was created. Because of this physical relationship, a snapshot may be maintained on the same storage array as the original data.

Each snapshot may include its own logical map. Where a logical map has not been updated from the time a first snapshot was taken to a time a subsequent snapshot was taken, snapshot logical maps may include identical tuples for the same LBA. As more snapshots are accumulated over time (i.e., increasing the number of snapshot logical maps), the number of references to the same PBA extent may increase.

Given the snapshot mapping architecture, dynamic relocation of valid (e.g., active) blocks to new locations during segment cleaning may introduce severe I/O overhead. For example, numerous metadata write I/Os at the snapshot logical maps needed to update the PBA for LBA(s) of multiple snapshots may result in poor snapshot performance at vSAN 116. As an illustrative example, where there are five snapshot logical maps and each snapshot logical map includes a tuple for a first LBA (e.g., <LBA1, PBA1>), if segment cleaning causes data block content associated with LBA1 to be relocated from PBA1 to PBA5, then five snapshot logical maps may need to be updated to reflect this change in location (e.g., update five snapshot logical maps from <LBA1, PBA1> to <LBA1, PBA5>) which may have adverse effects on snapshot performance.

A two-layer snapshot extent mapping architecture including a middle map may be used. Extent map 142 may map LBAs of a snapshot extent to an MBA of a middle map, where the MBA maps to one or more PBAs. Extent map 142 may be stored within in-memory metadata database 128 (as shown in FIG. 1 and described herein) as well as in persistent storage on the physical disk 118.

Figure 4:
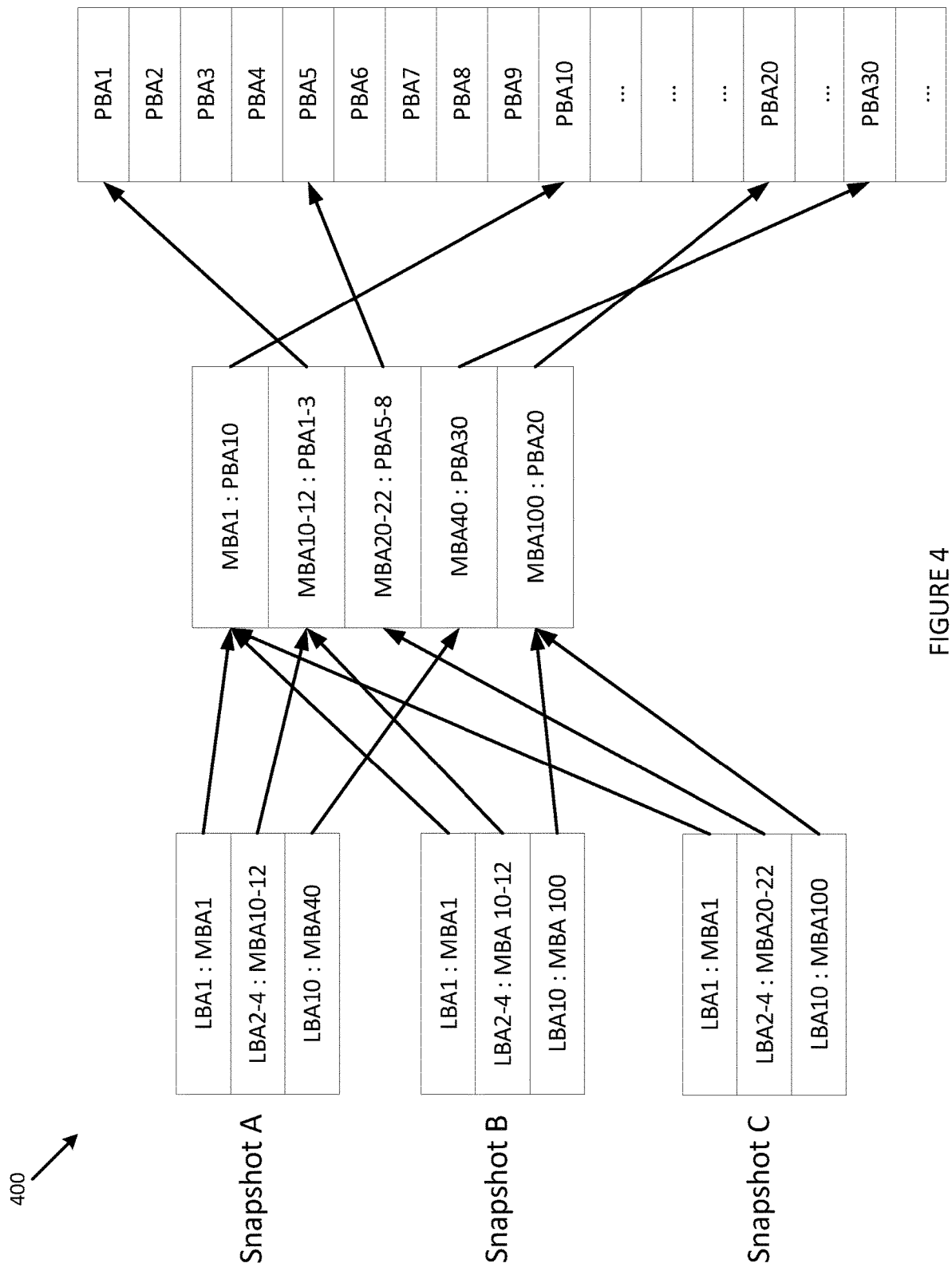
FIG. 4 is a diagram illustrating example two-layer snapshot extent mapping architecture, according to an example embodiment of the present disclosure.

FIG. 4 is a diagram illustrating an example two-layer snapshot extent mapping, according to an example embodiment of the present disclosure. As shown in FIG. 4, the first layer of the two-layer snapshot extent mapping architecture may include a snapshot logical map. The schema of the snapshot logical map may store a one tuple key <LBA> to a two-tuple value <MBA, numBlocks>. In some embodiments, other tuple values, such as a number of sectors, compression size, etc. may also be stored in the snapshot logical map. Because a middle map extent may refer to a number of contiguous blocks, value "numBlocks" may indicate a number of uncompressed contiguous middle map blocks for which the data is stored within.

The second layer of the two-layer snapshot extent mapping architecture includes a middle map responsible for maintaining a mapping between MBA(s) and PBA(s) (or physical sector address(es) (PSA(s)) of one or more sectors (e.g., each sector being 512-byte) of a physical block where blocks are compressed prior to storage). Accordingly, the schema of the middle map may store a one tuple key <MBA> and a two-tuple value <PBA, numBlocks>. Value "numBlocks" may indicate a number of contiguous blocks starting at the indicated PBA. Any subsequent overwrite may break the PBA contiguousness in the middle map extent, in which case an extent split may be triggered.

In certain embodiments, each physical block may be subdivided into a number of sectors (e.g., eight sectors). Accordingly, in certain embodiments each compressed data block may be stored in one or more sectors (e.g., each sector being 512 bytes) of a physical block. In such cases, the schema of the middle map may store a one tuple key <MBA> and a four-tuple value <PSA, numBlocks, numSectors, compression size>. In some embodiments, other tuple values, such as cyclic redundancy check (CRC), may also be stored in the middle map.

In the example of FIG. 4, LBA1 of snapshot A, LBA1 of snapshot B, and LBA1 of snapshot C all map to PBA10. Instead of mapping each of these references to the same PBA, a middle map extent may be created, and each reference points to the middle map extent specific for PBA10 (e.g., MBA1). In this case, LBA1 of snapshot A may be stored in snapshot logical map A as a tuple of <LBA1, MBA1>, LBA1 of snapshot B may be stored in snapshot logical map B as a tuple of <LBA1, MBA1>, and LBA1 of snapshot C may be stored in snapshot logical map C as a tuple of <LBA1, MBA1>. At the middle map, a tuple of <MBA1, PBA10> may be stored.

Accordingly, if data block content referenced by LBA1 of Snapshots A, B, and C is moved from PBA10 to another PBA, for example, PBA25, due to segment cleaning for full stripe write, only the single extent at the middle map can be updated to reflect the change of the PBA for all of the LBAs which reference that data block. This two-layer architecture reduces I/O overhead by not requiring the system to update multiple references to the same PBA extent at different snapshot logical maps. Additionally, the proposed two-layer snapshot extent architecture removes the need to keep another data structure to find all snapshot logical map pointers pointing to a middle map.

As discussed, when the size of stored data in the bank 126 (shown in FIG. 1 and FIG. 2) reaches a threshold size (e.g., the stripe size), in some cases with the help of segment cleaning, data in bank 126 may be flushed onto one or more disks in the capacity tier of vSAN 116. When flushing in-memory bank 126 and performing the full-stripe write, one or more LBAs for which data is stored in one or more physical blocks may be overwritten by writing new data to new one or more physical blocks and updating mappings associating the one or more LBAs with the new one or more physical blocks. Such overwriting of data associated with one or more LBAs may be referred to as overwriting one or more LBAs. Accordingly, logical to physical mapping tables, including the corresponding logical map and/or the corresponding middle map, may be updated to reflect this change in physical address(es) of data block content stored for one or more LBAs in order to maintain the integrity of the two-layer mapping architecture.

Aspects of the present disclosure present a hybrid approach for updating extents of the snapshot mapping architecture when writing payload data associated with one or more LBAs to new physical blocks in vSAN 116. The hybrid updating approach presented herein seeks to optimize performance of the vSAN 116 by providing multiple updating approaches such that metadata I/Os on extent mapping tables may be reduced for single, logical map extent overwrites by using a particular updating approach for the update being done.

Figure 5:
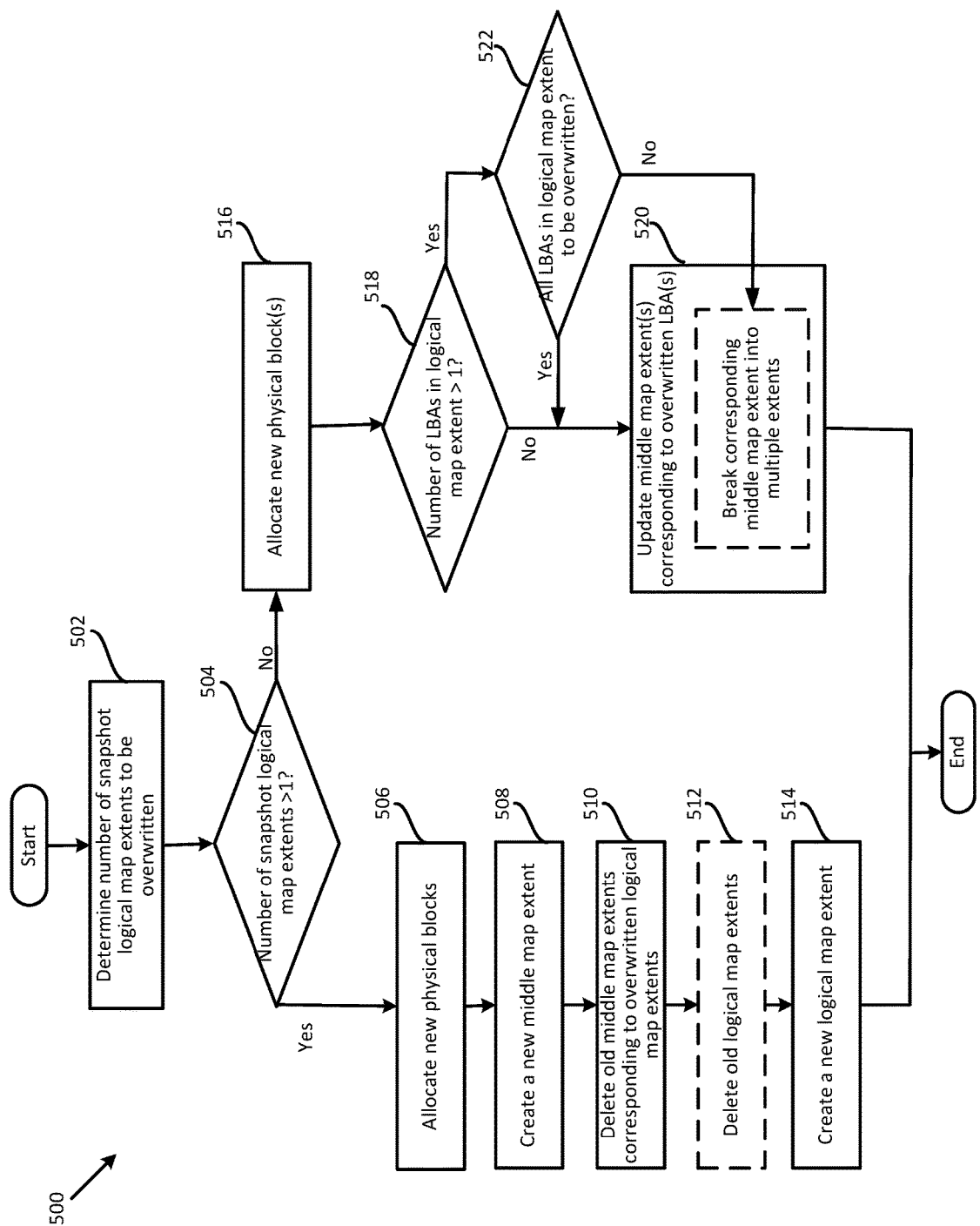
FIG. 5 is an example workflow for updating snapshot logical to physical mapping tables, in accordance with example embodiments of the present disclosure.

FIG. 5 is an example workflow 500 for updating snapshot logical to physical mapping tables, in accordance with example embodiments of the present disclosure. The workflow 500 may be used to update extents of the two-layer mapping architecture. Workflow 500 of FIG. 5 may be understood with reference to snapshot mapping architectures 600, 700, and 800 illustrated in FIGS. 6, 7, and 8, respectively.

Workflow 500 may begin, at 502, by determining a number of logical map extents of a single snapshot to be overwritten. For example, vSAN module 108 may perform a full-stripe write, including overwriting one or more LBAs in extent map 142 for a snapshot. In other words, at 502, an existing extent map 142, mapping LBA(s) of a snapshot logical map extent to MBA(s) of a middle map extent, may be referenced to determine the number of logical map extents storing one or more LBAs for which data is to be written to new physical blocks.

At 504, where multiple logical map extents include LBAs to be overwritten in a full stripe write, then a first updating approach may be used to update extent map 142. At 506, new physical blocks may be allocated (e.g., within the segment for full stripe write) for the payload data. Physical blocks for writing the payload data associated with the LBAs may be located in the capacity tier of vSAN 116. At 508, a new middle map extent having a new MBA may be created and inserted into the middle map. The new middle map extent may include multiple contiguous blocks and may store a one tuple key <MBA> and a two-tuple value <PBA, numBlocks> indicating physical addresses of new physical blocks allocated for storing the payload data in the capacity tier. In some cases, the new tuple stored in the middle map table may be a one tuple key <MBA> and a four-tuple value <PSA, numBlocks, numSectors, compression size> where the data block content is compressed into sectors.

At 510, old middle map extents associated with the overwritten logical map extents may be deleted from the middle map table. Old middle map extents may be retrieved by referencing tuples of <LBA, MBA> stored in the logical map table, where LBA is the key.

Optionally, in some cases where old logical map extents associated with the overwritten LBAs are unable to be reused, at 512, the old logical map extents may be deleted from the logical map table. Old logical map extents may only be reused to update the old logical map extent. For example, for an overwrite of two logical map extents, [LBA1, LBA2] and [LBA3], where extent [LBA1, LBA2] has a corresponding tuple stored in the logical map table as <LBA1, numBlocks=2, MBA1-2>, the old logical map extent may be updated to [LBA1, LBA3], and its tuple may be updated to <LBA1, numBlocks=2, MBA4-6>, wherein the MBA4-6 is the new middle map extent. The [LBA3] extent may be deleted if it cannot be reused. Accordingly, reusing old logical map extents may result in reduced compute resources and I/O costs.

At 514, a new logical map extent may be created. In some cases, a new logical map extent may created using an old logical map extents, as described with respect to 512. The new logical map extent may include multiple contiguous blocks and store a one tuple key <LBA> and a two-tuple value <MBA, numBlocks> identifying the new middle map extent and its corresponding MBA. All overwritten LBAs may be associated with the new logical map extent, rather than creating a new logical map extent for each overwritten LBA.

Figure 6:
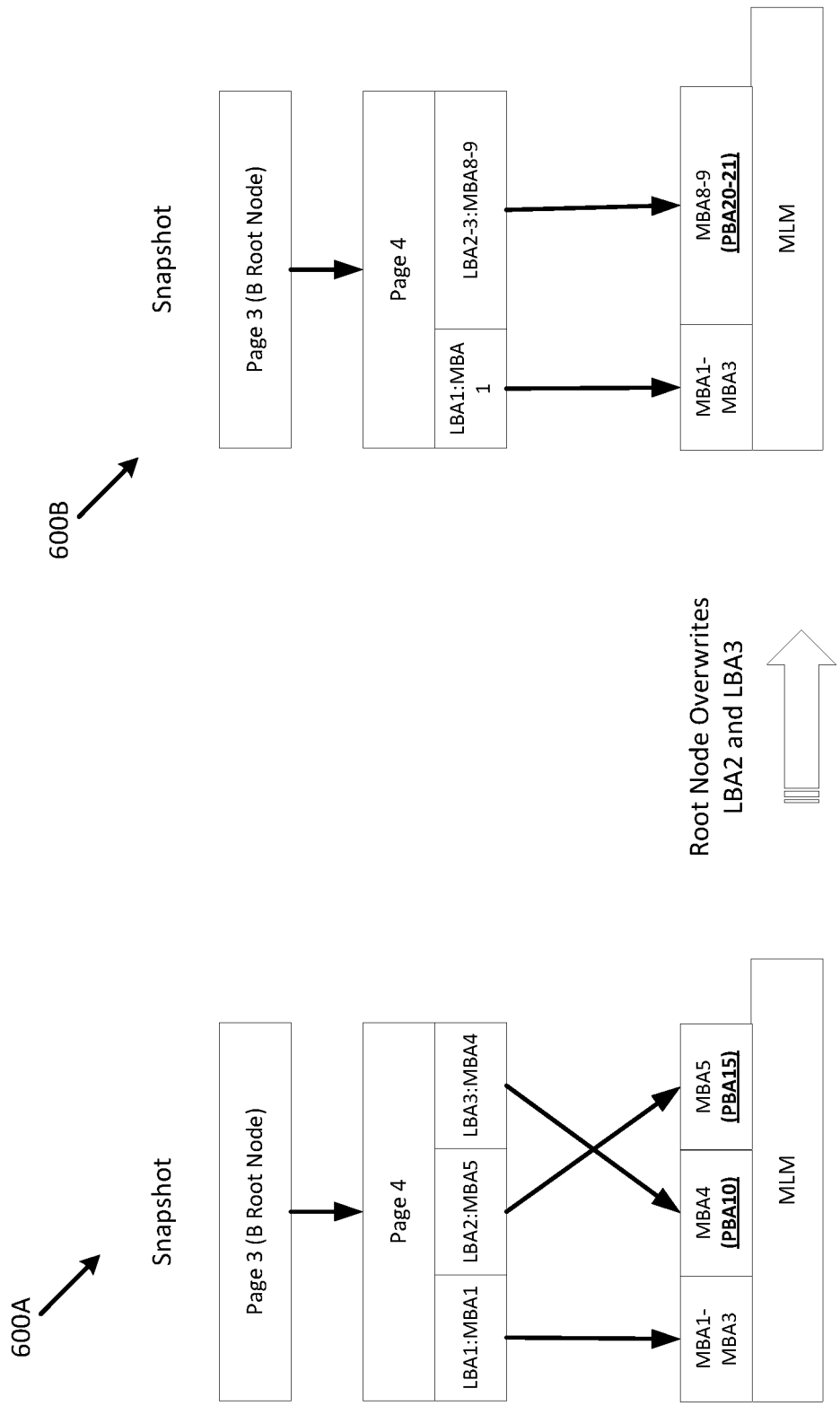
FIG. 6 is a diagram illustrating an example snapshot mapping architecture update for an overwrite of multiple logical map extents, according to an example embodiment of the present disclosure.

FIG. 6, discussed in more detail below, provides an illustrative example of the updating technique described above with respect to 504-512.

Referring back to 504, where only one logical map extent exists for LBA(s) to be overwritten in a full stripe write, then at 516, new physical blocks may be allocated (e.g., within the segment for full stripe write) for the payload data. Physical blocks for writing the payload data associated with the LBAs may be located in the capacity tier of vSAN 116.

At 518, the number of LBAs of the identified logical map extent may be considered for determining the updating approach to be used for updating extent map 142. If the logical map extent to be overwritten includes only one LBA (e.g., the LBA to be overwritten, where only one LBA is being overwritten), then at 518, the middle map extent corresponding to the identified logical map extent, and more specifically, to the overwritten LBA, may be updated to reflect the new physical address of a new physical block allocated for storing the payload data in the capacity tier. The middle map extent may be retrieved by referencing tuples of <LBA, MBA> stored in the logical map table, where LBA is the key. The middle map extent tuple stored in the middle map table may be updated from <MBA, old PBA> to <MBA, new PBA> to reflect the overwrite of the data block content to a new physical block (e.g., new PBA or PSA).

Figure 7:
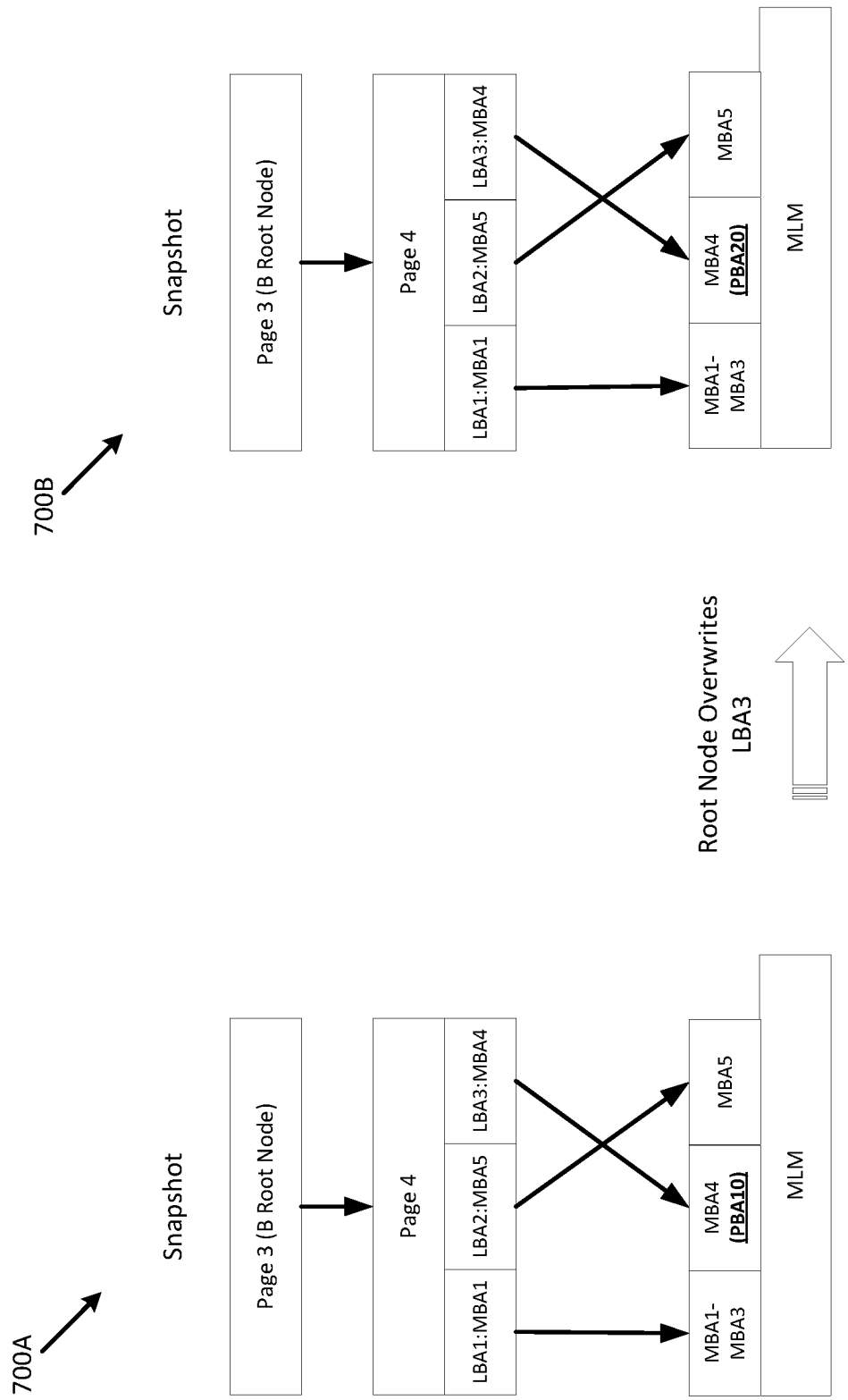
FIG. 7 is a diagram illustrating an example snapshot mapping architecture update for an overwrite of only one logical map extent associated with a single logical block address (LBA), according to an example embodiment of the present disclosure.

FIG. 7, discussed in more detail below, provides an illustrative example of the updating technique described above with respect to 504, 516, 518, and 520 (not including the extent split).

Referring back to 518, if the identified logical map extent includes more than one LBA (e.g., LBA1, LBA2, and LBA3 in one logical map extent), then at 522, the system determines whether all, or less than all, LBAs of the logical map extent are to be overwritten.

At 522, if all LBAs of the logical map extent are to be overwritten, then at 520, the middle map extent corresponding to the identified logical map extent, and more specifically, to the overwritten LBAs, may be updated to reflect new physical addresses (e.g., new PBAs or PSAs) of new physical blocks allocated for storing the payload data in the capacity tier. For example, a logical map extent may include LBA1, LBA2, and LBA3 (e.g., [LBA1-3:MBA1-3]). If all LBAs of the extent (e.g., LBA1, LBA2, and LBA3) are to be overwritten, then new physical blocks may be allocated for the overwrite and the middle map extent may be updated to reflect overwrite of the data block content to new physical blocks.

At 522, if less than all LBAs of the logical map extent are to be overwritten, at 520 the middle map extent corresponding to the identified logical map extent may be fragmented into multiple middle map extents, each corresponding to an LBA of the logical map extent. For example, if a logical map extent includes LBA1, LBA2, and LBA3 and only LBA2 is to be overwritten, the middle map extent corresponding to this logical map extent may be broken into three middle map extents, where one new middle map extent corresponds to LBA1 of the logical map extent, one new middle map extent corresponds to LBA2, and one new middle map extent corresponds to LBA3. The middle map extent corresponding to the overwritten LBA only, may be updated to reflect new physical addresses (e.g., new PBAs or PSAs) of new physical blocks allocated for storing the payload data in the capacity tier. In the illustrative example, the middle map extent corresponding to LBA2 may be updated to reflect the new PBA while PBAs of middle map extents corresponding to LBA1 and LBA3 may remain unchanged. In this case, I/Os may be used to update the middle map, but I/Os may not be performed on the existing logical map extent (e.g., the logical map extent may remain unchanged). Further, this extent split may be handled together with updating the middle map extent for the overwrite such that no additional I/O may be required.

Figure 8:
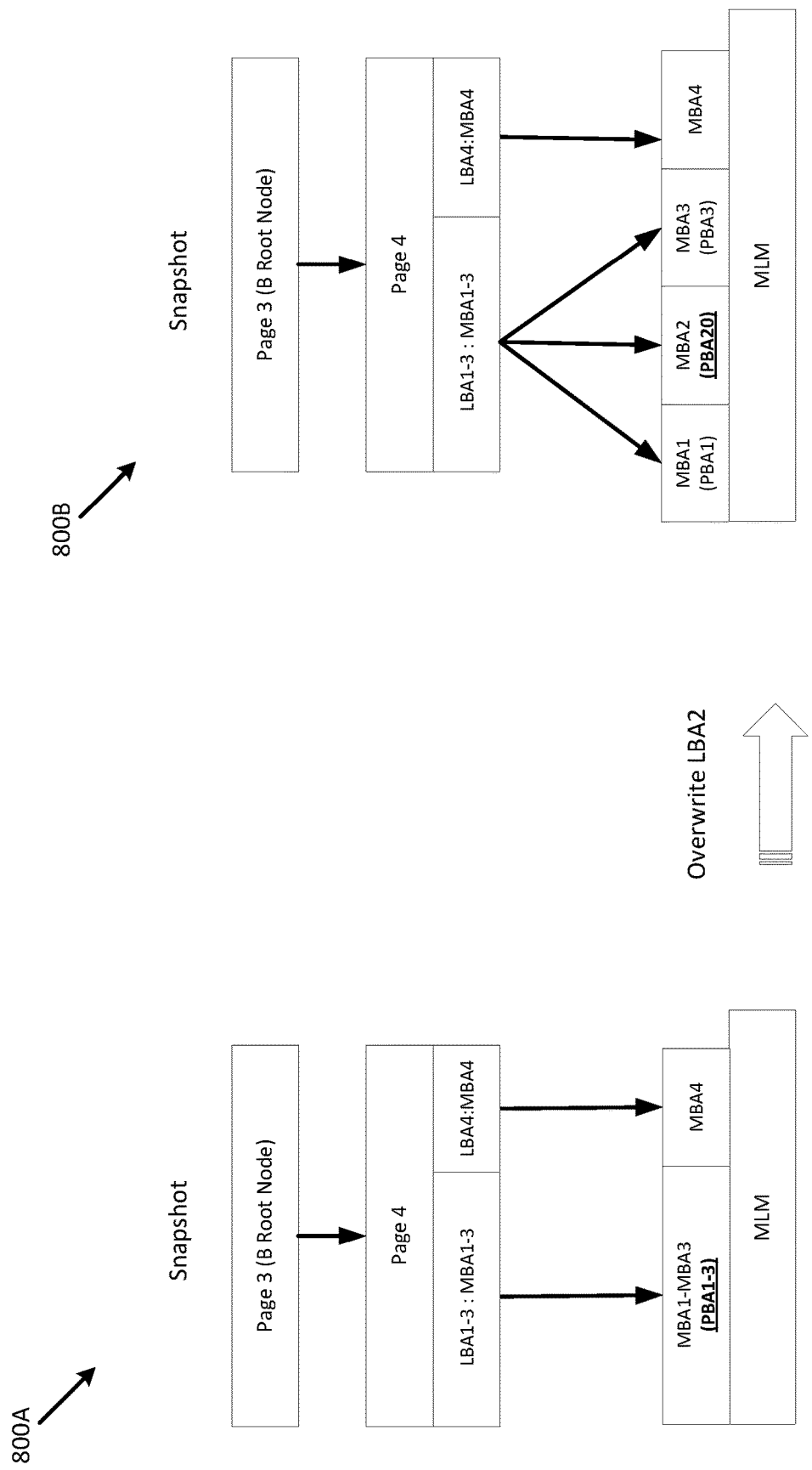
FIG. 8 is a diagram illustrating an example snapshot mapping architecture update for an overwrite of only one logical map extent associated with multiple LBAs, according to an example embodiment of the present disclosure.

FIG. 8, discussed in more detail below, provides an illustrative example of the updating technique described above with respect to 504, 516, 518, 522, and 520 (including the extent split).

FIG. 6 is a diagram illustrating an example snapshot mapping architecture 600 for an overwrite of multiple logical extents, according to an example embodiment of the present disclosure. As shown in FIG. 6, multiple LBAs, LBA2 and LBA3, of a snapshot are overwritten, thereby triggering an update to extent table 142.

In the example illustrated in FIG. 6, data block content associated with LBA2 is stored in PBA15 and data block content associated with LBA3 is stored in PBA10. Due to the overwrite of LBA2 and LBA3 caused by a full stripe write to the capacity tier of vSAN 116, new blocks are allocated for payload data associated with LBA2 and LBA3, specifically physical blocks corresponding to PBA20 and PBA21, respectively.

As shown in mapping architecture 600A, LBA2 is mapped in a first logical map extent [LBA2] with a tuple of <LBA2, MBA5> stored in the logical map table for the snapshot. LBA3 is mapped in a second logical map extent [LBA3] with a tuple of <LBA3, MBA4> stored in the logical map table for the snapshot. Because LBA2 and LBA3 correspond to two logical map extents (e.g., more than 1 logical map extent), a new middle map extent may be created for the overwrite of LBA2 and LBA3. Additionally, a new logical map extent [LBA2, LBA3] may be created. In this illustrative example, old logical map extent [LBA2] may be reused in the creation of the new logical map extent, while old logical map extent [LBA3] may be deleted in this overwrite.

As shown in updated mapping architecture 600B, new middle map extent [MBA8, MBA5] is created and inserted into the middle map. A tuple of <MBA8-9, PBA20-21> for this middle map extent may be stored in the middle map table to maintain a mapping of MBAs 8-9 to PBAs 20-21, wherein PBAs 20-21 correspond to physical blocks where data block content of LBA2 and LBA3 was overwritten.

Old middle map extents, [MBA4] and [MBA5] may be deleted from the middle map table. These extents may be retrieved by referencing the logical map table storing tuples of <LBA, MBA>. In other words, by looking up LBA2 and LBA3 in tuples of the logical map table, the system may be able to determine old middle map addresses of middle map extents associated with LBA2 and LBA3 (e.g., MBA4 and MBA5). Accordingly, middle block extents corresponding to MBA4 and MBA5 are removed from the middle map, along with their tuples stored in the middle map table.

As shown in updated mapping architecture 600B, old logical map extent [LBA3] associated with overwritten LBA3, is deleted from the logical map, along with its tuple stored in the logical map table. Old logical map extent [LBA2] is reused and updated to be logical map extent [LBA2, LBA3], to merge LBA2 and LBA3 into one logical map extent. The logical map table is updated to include this updated extent by storing a tuple of <LBA2-3, MBA8-9>, where MBA8-9 is the MBA for the newly created middle map extent.

The example updating approach illustrated in FIG. 6 may help to defragment the middle map by creating a single middle map extent in the place of two old middle map extents when overwriting data block content associated with multiple LBAs. Additionally, this approach may maintain spatial locality by storing data block content in physical blocks in adjacent storage locations. However, such advantages presented in this approach may be at the expense of increased I/O overhead given the number of I/Os required to delete, create, and update multiple extents in the mapping architecture.

Due to large I/O overhead, the approach presented in FIG. 6 may not provide efficient performance for write requests requesting to overwrite a single logical map extent (or less than all LBAs of a single logical map extent). Therefore, another approach for updating snapshot logical to physical mapping tables is presented herein. The second approach may be used to update a PBA of an existing tuple stored in the middle map (i.e., for an overwrite) without creating a new middle map extent and without updating the logical map extent. Accordingly, the second approach may save I/O costs.

FIG. 7 is a diagram illustrating an example snapshot mapping architecture update for an overwrite of only one logical map extent associated with a single LBA, according to an example embodiment of the present disclosure. As shown in FIG. 7, LBA3 of the snapshot is overwritten, thereby triggering an update to extent table 142.

LBA3 is mapped in a logical map extent [LBA3] with a tuple of <LBA3, MBA4> stored in the logical map table for the snapshot. Because LBA3 corresponds to a single logical map extent, existing extents may be maintained and updated to reflect the overwrite to a new physical block (e.g., new PBA). Accordingly, I/O costs to delete an old middle map extent corresponding to this logical map extent, create a new middle map extent, and update the logical map extent may be saved.

In the example shown in FIG. 7, in mapping architecture 700A, data block content associated with LBA3 is stored in PBA10. Due to the overwrite of LBA3 caused by a full stripe write to the capacity tier of vSAN 116, a new physical block is allocated to store data block content associated with LBA3, specifically a physical block corresponding to PBA20. The existing tuple stored in the middle map table for LBA3 is updated to reflect the overwrite of LBA3 with PBA20.

A middle map extent corresponding to the logical map extent associated with LBA3 may be retrieved by referencing the logical map table storing tuples of <LBA, MBA>. In other words, by looking up LBA3 in tuples of the logical map table, the system may be able to locate middle map address, MBA4, which is mapped in middle map extent, [MBA4], associated with the logical map extent for LBA3 prior to the full stripe write. For [MBA4], the middle map table previously stored a tuple of <MBA4, PBA10>. As shown in updated mapping architecture 700B, the existing tuple is updated from <MBA4, PBA10> to <MBA4, PBA20> to reflect the change in the PBA of the data block content associated with LBA3.

The example updating approach illustrated in FIG. 7 may help to reduce I/O overhead for updating the mapping architecture following a full stripe write to new physical blocks. Only an I/O to update the previously stored middle map extent may be needed to update the logical to physical mapping for an overwrite of a single logical map extent associated with a single LBA. Additionally, central processing unit (CPU) costs may be reduced given the reduction in required I/Os to update the mapping. This may increase efficiency, and overall performance, of snapshot architecture in vSAN 116.

FIG. 8 is a diagram illustrating an example snapshot mapping architecture update for an overwrite of only one logical map extent associated with multiple LBAs, according to an example embodiment of the present disclosure. As shown in FIG. 8, LBA2 of the snapshot is included in logical map extent [LBA1, LBA3] is overwritten, thereby triggering an update to extent table 142.

As shown in mapping architecture 800A, LBA2 is associated with logical map extent [LBA1, LBA3] having a tuple of <LBA1-3, MBA1-3> stored in the logical map table for the snapshot. As shown in the updated mapping architecture 800B, new physical blocks are allocated for the overwrite of data block content associated with LBA2 and middle map extent MBA2 corresponding to LBA2 is updated to reflect the new physical address of a new physical blocks allocated for storing the data block content associated with LBA2 in the capacity tier. Because LBA2 is associated with a single logical map extent, the existing tuple corresponding to middle map extent [MBA1, MBA3] corresponding to the logical map extent [LBA1, LBA3] may be updated to reflect the overwrite to a new physical block. Because LBA2 is associated with logical map extent [LBA1, LBA3] that is also associated with two other LBAs not being overwritten, LBA1 and LBA3, the middle map extent may be split into multiple middle map extents. As shown in the updated mapping architecture 800B, middle map extent [MBA1, MBA3] is fragmented into three middle map extents, [MBA1], [MBA2], and [MBA3], where each middle map extent corresponds to an LBA in the existing logical map extent, and the existing tuple stored in the middle map table may be broken into multiple tuples including <MBA1, PBA1>, <MBA2, PBA20>, and <MBA3, PBA3>. In the illustrative example, tuple <MBA2, PBA2> stored in the middle map table is updated from <MBA2, PBA2> to <MBA2, PBA20> to reflect the change in physical address of the data block content during the full stripe write. Tuples <MBA1, PBA1> and <MBA3, PBA3> remain unchanged given LBA1 and LBA3 were not overwritten in this example.

The example updating approach illustrated in FIG. 8 may help to reduce aggregate I/O overhead for updating the mapping architecture following a full stripe write to new physical blocks. I/O overhead and compute power may be reduced compared to other approaches requiring deletion, creation, and updates to logical and middle map extents.

In some scenarios, the full stripe write may overwrite data for multiple LBAs, wherein each LBA is associated with a different logical map extent and at least one of the snapshot logical extents is associated with multiple LBAs. For example, a full stripe write may include an overwrite of data block content associated with LBA2, LBA3, and LBA4 of the snapshot, where LBA4 is mapped in logical map extent [LBA4] to middle map extent [MBA4] and LBA2 is mapped in logical map extent [LBA1, LBA3] to middle map extent [MBA1, MBA3]). In this scenario, new physical blocks may be allocated for storing the data block content, and a new middle map extent may be created with reference to these new physical addresses. Specifically, old middle map extent [LBA1, LBA3] may be split and updated, where [LBA1] associated with tuple <LBA1, MBA1> may remain unchanged. [LBA2, LBA4] is created and mapped to new middle extent [MBA5, MBA7]. Old logical map extent [LBA4] may be deleted.

The various embodiments described herein may optimize performance of the vSAN 116 by providing multiple updating approaches. Using a particular updating approach for the update being done may help to achieve at least one of defragmentation of the two-layer mapping architecture, spatial locality, or reduced I/O overhead.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for updating block addresses, comprising:
    overwriting content of a first data block referenced by a first logical block address (LBA) with updated content, wherein prior to the overwriting, the content of the first data block is stored in a first physical block corresponding to a first physical block address (PBA), wherein after the overwriting, the updated content of the first data block is stored in a second physical block corresponding to a second PBA, and wherein prior to the overwriting a logical map maps the first LBA to a first middle block address (MBA) and a middle map maps the first MBA to the first PBA; and in response to the overwriting, updating the middle map to map the first MBA to the second PBA instead of the first PBA.

2. The method of claim 1, further comprising:
determining that the overwrite of the content of the first data block referenced by the first LBA is an overwrite of a single logical extent in the logical map, wherein the first LBA mapping is updated from the first PBA to the second PBA by updating the middle map to map the first MBA to the second PBA is based on the determination that the overwrite is of the single logical extent.

3. The method of claim 2, wherein the single logical extent in the logical map includes the first LBA and one or more other LBAs and the first MBA is in a middle map extent in the middle map including one or more other MBAs mapped to the one or more other LBAs, and further comprising:
breaking the middle map extent into multiple middle map extents each middle map extent including a single MBA and mapped to a single LBA, wherein one of the multiple middle map extents corresponds to the first LBA and the first MBA, wherein updating the middle map to map the first MBA to the second PBA instead of the first PBA comprises updating only the one of the multiple middle map extents.

4. The method of claim 1, further comprising:
overwriting content of a second data block referenced by a second LBA with updated content, wherein prior to the overwriting the content of the first data block is stored in a third physical block corresponding to a third PBA, wherein after the overwriting the updated content of the first data block is stored in a fourth physical block corresponding to a fourth PBA, and wherein prior to the overwriting the logical map maps the second LBA to a second MBA and a middle map maps the second MBA to the third PBA; and in response to the overwriting:
creating a third MBA;
mapping the third MBA to the fourth PBA in the middle map; and
deleting the mapping of the second MBA to the third PBA from the middle map.

5. The method of claim 4, in response to the overwriting, further comprising:
updating the logical map to map the second LBA to the third MBA instead of the second MBA.

6. The method of claim 4, further comprising:
determining that the overwrite of the content of the second data block referenced by the second LBA is included as part of an overwrite of multiple logical extents in the logical map, wherein the second LBA mapping is updated from the third PBA to the fourth PBA by the creating the third MBA and mapping the second LBA to the third MBA is based on the determination that the overwrite is of multiple logical extents.

7. The method of claim 6, in response to the overwriting, further comprising:
merging the multiple logical extents included as part of the overwrite into a single logical extent in the logical map.

8. A system comprising one or more processors and a non-transitory computer readable medium comprising instructions that, when executed by the one or more processors, cause the system to perform a method for updating block addresses, the method comprising:
overwriting content of a first data block referenced by a first logical block address (LBA) with updated content, wherein prior to the overwriting the content of the first data block is stored in a first physical block corresponding to a first physical block address (PBA), wherein after the overwriting the updated content of the first data block is stored in a second physical block corresponding to a second PBA, and wherein prior to the overwriting a logical map maps the first LBA to a first middle block address (MBA) and a middle map maps the first MBA to the first PBA; and in response to the overwriting, updating the middle map to map the first MBA to the second PBA instead of the first PBA.

9. The system of claim 8, the method further comprising:
determining that the overwrite of the content of the first data block referenced by the first LBA is an overwrite of a single logical extent in the logical map, wherein the first LBA mapping is updated from the first PBA to the second PBA by updating the middle map to map the first MBA to the second PBA is based on the determination that the overwrite is of the single logical extent.

10. The system of claim 9, wherein the single logical extent in the logical map includes the first LBA and one or more other LBAs and the first MBA is in a middle map extent in the middle map including one or more other MBAs mapped to the one or more other LBAs, the method further comprising:
breaking the middle map extent into multiple middle map extents each middle map extent including a single MBA and mapped to a single LBA, wherein one of the multiple middle map extents corresponds to the first LBA and the first MBA, wherein updating the middle map to map the first MBA to the second PBA instead of the first PBA comprises updating only the one of the multiple middle map extents.

11. The system of claim 8, the method further comprising:
overwriting content of a second data block referenced by a second LBA with updated content, wherein prior to the overwriting the content of the first data block is stored in a third physical block corresponding to a third PBA, wherein after the overwriting the updated content of the first data block is stored in a fourth physical block corresponding to a fourth PBA, and wherein prior to the overwriting the logical map maps the second LBA to a second MBA and a middle map maps the second MBA to the third PBA; and in response to the overwriting:
creating a third MBA;
mapping the third MBA to the fourth PBA in the middle map; and
deleting the mapping of the second MBA to the third PBA from the middle map.

12. The system of claim 11, in response to the overwriting, the method further comprising:
updating the logical map to map the second LBA to the third MBA instead of the second MBA.

13. The system of claim 11, the method further comprising:
determining that the overwrite of the content of the second data block referenced by the second LBA is included as part of an overwrite of multiple logical extents in the logical map, wherein the second LBA mapping is updated from the third PBA to the fourth PBA by the creating the third MBA and mapping the second LBA to the third MBA is based on the determination that the overwrite is of multiple logical extents.

14. The system of claim 13, in response to the overwriting, further comprising:

merging the multiple logical extents included as part of the overwrite into a single logical extent in the logical map.

15. A non-transitory computer readable medium comprising instructions that, when executed by one or more processors of a computing system, cause the computing system to perform a method for updating block addresses, the method comprising:

overwriting content of a first data block referenced by a first logical block address (LBA) with updated content, wherein prior to the overwriting the content of the first data block is stored in a first physical block corresponding to a first physical block address (PBA), wherein after the overwriting the updated content of the first data block is stored in a second physical block corresponding to a second PBA, and wherein prior to the overwriting a logical map maps the first LBA to a first middle block address (MBA) and a middle map maps the first MBA to the first PBA; and in response to the overwriting, updating the middle map to map the first MBA to the second PBA instead of the first PBA.

16. The non-transitory computer readable medium of claim 15, the method further comprising:

determining that the overwrite of the content of the first data block referenced by the first LBA is an overwrite of a single logical extent in the logical map, wherein the first LBA mapping is updated from the first PBA to the second PBA by updating the middle map to map the first MBA to the second PBA is based on the determination that the overwrite is of the single logical extent.

17. The non-transitory computer readable medium of claim 16, wherein the single logical extent in the logical map includes the first LBA and one or more other LBAs and the first MBA is in a middle map extent in the middle map including one or more other MBAs mapped to the one or more other LBAs, the method further comprising:

breaking the middle map extent into multiple middle map extents each middle map extent including a single MBA and mapped to a single LBA, wherein one of the multiple middle map extents corresponds to the first LBA and the first MBA, wherein updating the middle map to map the first MBA to the second PBA instead of the first PBA comprises updating only the one of the multiple middle map extents.

18. The non-transitory computer readable medium of claim 15, the method further comprising:

overwriting content of a second data block referenced by a second LBA with updated content, wherein prior to the overwriting the content of the first data block is stored in a third physical block corresponding to a third PBA, wherein after the overwriting the updated content of the first data block is stored in a fourth physical block corresponding to a fourth PBA, and wherein prior to the overwriting the logical map maps the second LBA to a second MBA and a middle map maps the second MBA to the third PBA; and in response to the overwriting:

creating a third MBA;

mapping the third MBA to the fourth PBA in the middle map; and deleting the mapping of the second MBA to the third PBA from the middle map.

19. The non-transitory computer readable medium of claim 18, in response to the overwriting, the method further comprising:

updating the logical map to map the second LBA to the third MBA instead of the second MBA.

20. The non-transitory computer readable medium of claim 18, the method further comprising:

determining that the overwrite of the content of the second data block referenced by the second LBA is included as part of an overwrite of multiple logical extents in the logical map, wherein the second LBA mapping is updated from the third PBA to the fourth PBA by the creating the third MBA and mapping the second LBA to the third MBA is based on the determination that the overwrite is of multiple logical extents.

* * * * *